United States Patent
Kim et al.

(10) Patent No.: US 9,319,192 B2
(45) Date of Patent: Apr. 19, 2016

(54) METHOD FOR TRANSMITTING CONTROL INFORMATION BY A BASE STATION IN A WIRELESS COMMUNICATION SYSTEM, AND DEVICE THEREFOR

(75) Inventors: Kitae Kim, Anyang-si (KR); Jinyoung Chun, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 14/235,316

(22) PCT Filed: May 24, 2012

(86) PCT No.: PCT/KR2012/004120
§ 371 (c)(1),
(2), (4) Date: Mar. 20, 2014

(87) PCT Pub. No.: WO2013/015517
PCT Pub. Date: Jan. 31, 2013

(65) Prior Publication Data
US 2014/0192755 A1    Jul. 10, 2014

Related U.S. Application Data

(60) Provisional application No. 61/511,555, filed on Jul. 26, 2011.

(51) Int. Cl.
*H04Q 7/00*        (2006.01)
*H04L 5/00*        (2006.01)
*H04W 72/04*       (2009.01)

(52) U.S. Cl.
CPC ............ *H04L 5/0037* (2013.01); *H04L 5/0053* (2013.01); *H04W 72/042* (2013.01); *H04L 5/0007* (2013.01); *H04W 72/0446* (2013.01)

(58) Field of Classification Search
None
See application file for complete search history.

(56) References Cited

U.S. PATENT DOCUMENTS

2011/0044391 A1* 2/2011 Ji et al. .......................... 375/260
2011/0274031 A1* 11/2011 Gaal et al. ..................... 370/315

(Continued)

FOREIGN PATENT DOCUMENTS

EP          2302830 A2    3/2011
WO     WO 2010/076300 A1   7/2010

OTHER PUBLICATIONS

NEC Group, "Physical resources block (PRB) configurations for ePDCCH transmission," 3GPP TSG RAN WG1 Meeting #69, R1-122596, Prague, Czech Republic, May 21-25, 2012, pp. 1-4.

(Continued)

*Primary Examiner* — Duc C Ho
(74) *Attorney, Agent, or Firm* — Birch, Stewart, Kolasch & Birch, LLP

(57) ABSTRACT

The present application discloses a method for transmitting, by a base station, downlink control information to a terminal in a wireless communication system. More particularly, the method comprises the steps of: allocating, to a transmission resource, the downlink control information for the terminal; and transmitting, to the terminal, the downlink control information using the transmission resource. the downlink control information for the terminal comprises: a downlink grant; and an uplink grant, wherein the downlink grant is allocated to one of first and second slots of a subframe of the transmission resource, and the uplink grant is allocated to at least one of first and second slots of a subframe of the transmission resource.

15 Claims, 17 Drawing Sheets

(56) References Cited

U.S. PATENT DOCUMENTS

| | | | |
|---|---|---|---|
| 2013/0003604 A1* | 1/2013 | Blankenship et al. | 370/255 |
| 2013/0003663 A1* | 1/2013 | Blankenship et al. | 370/329 |
| 2013/0039284 A1* | 2/2013 | Marinier et al. | 370/329 |
| 2013/0242947 A1* | 9/2013 | Chen et al. | 370/335 |

OTHER PUBLICATIONS

Research in Motion, UK Limited, "Other Control Channels for E-PDCCH," 3GPP TSG RAN WG1 Meeting #69, R1-122724, Prague, Czech Republic, May 21-25, 2012, pp. 1-4.

\* cited by examiner

FIG. 1 --Prior Art--

FIG. 2
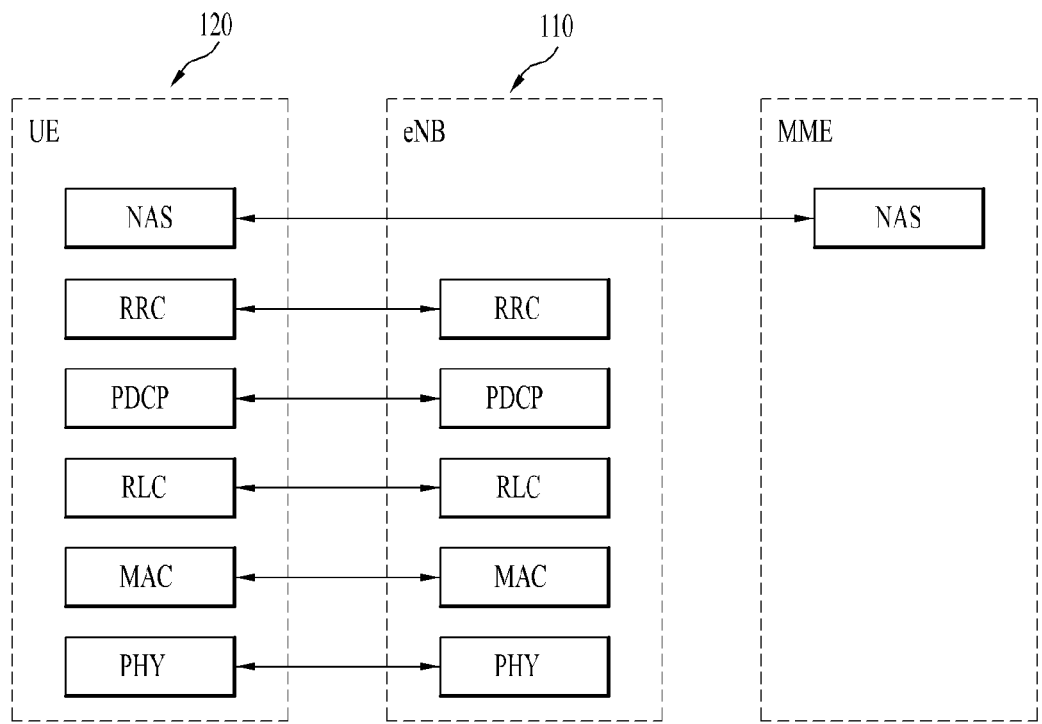
(a) Control-plane protocol stack
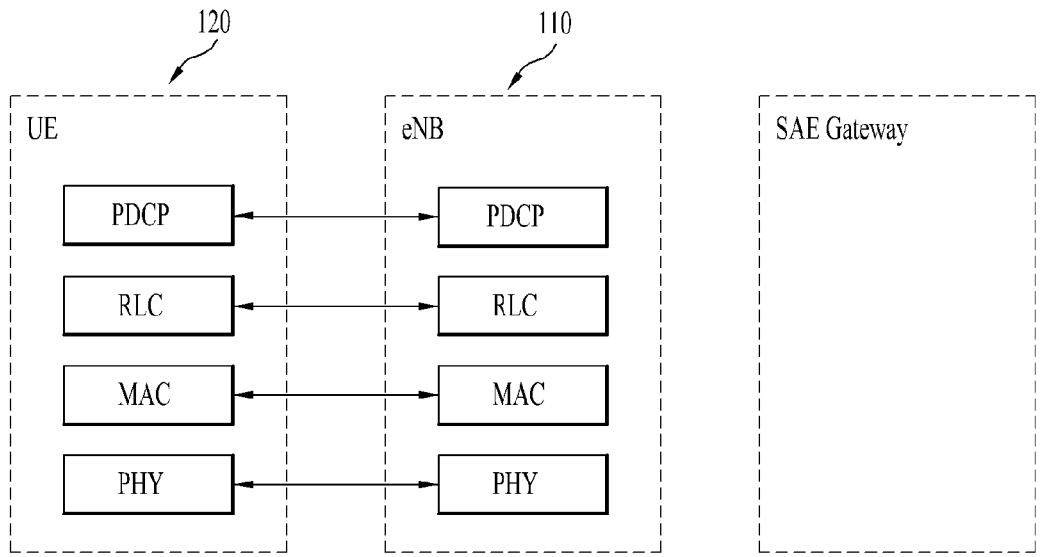
(b) User-plane protocol stack FIG. 6
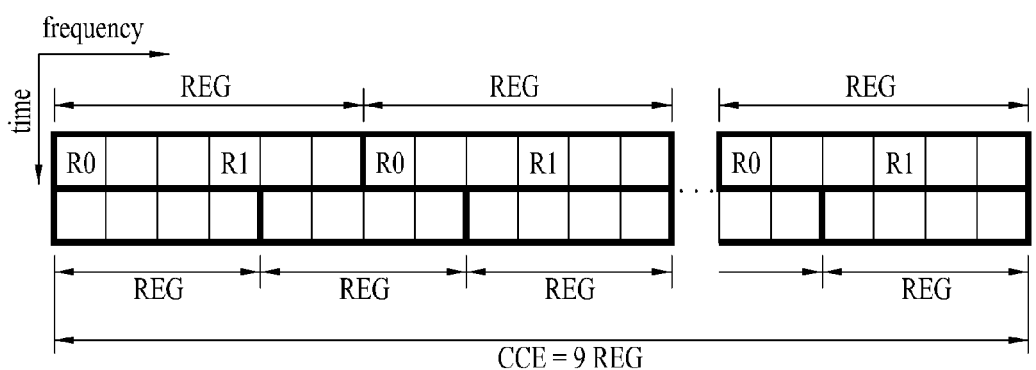
(a) 1 TX or 2 TX
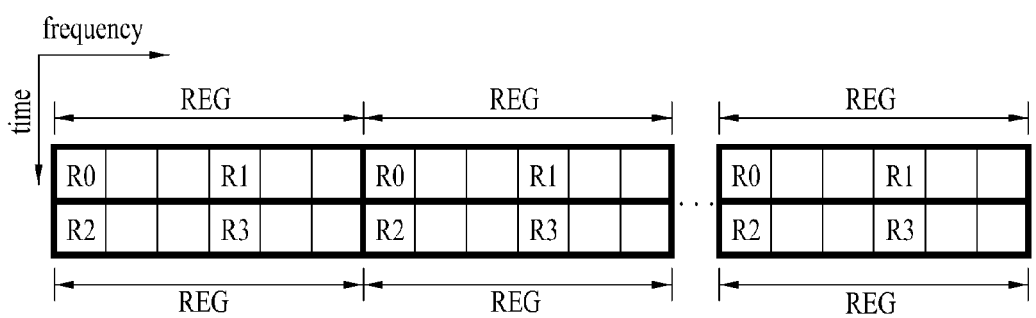
(b) 4 TX FIG. 13 --Prior Art--

FIG. 14    --Prior Art--

METHOD FOR TRANSMITTING CONTROL INFORMATION BY A BASE STATION IN A WIRELESS COMMUNICATION SYSTEM, AND DEVICE THEREFOR

CROSS REFERENCE TO RELATED APPLICATIONS

This application is the National Phase of PCT/KR2012/004120 filed on May 24, 2012, which claim priority under 35 U.S.C. 119(e) to U.S. Provisional Application No. 61/511,555 filed on Jul. 26, 2011, all of which are hereby expressly incorporated by reference into the present application.

TECHNICAL FIELD

The present invention relates to a wireless communication system, and more particularly, to a method of transmitting control information, which is transmitted by an eNode B in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of transmitting control information, which is transmitted by an eNode B in a wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment of the present invention, a method of transmitting downlink control information, which is transmitted by an eNode B to a user equipment in a wireless communication system, includes the steps of allocating downlink control information for the user equipment to a transmission resource and transmitting the downlink control information to the user equipment using the transmission resource, wherein the downlink control information for the user equipment includes a downlink grant and an uplink grant, wherein the downlink grant is allocated to either a first slot or a second slot of a subframe among the transmission resource, wherein the uplink grant is allocated to at least one of a first slot and a second slot of a subframe among the transmission resource. In this case, the transmission resource corresponds to a data region of the subframe.

Preferably, the downlink grant is allocated to the first slot of the subframe only among the transmission resource. More preferably, data information for the user equipment is allocated to at least one of a first slot and a second slot of a subframe among the transmission resource.

To further achieve these and other advantages and in accordance with the purpose of the present invention, according to a different embodiment of the present invention, an eNode B device in a wireless communication system includes a processor configured to allocate downlink control information for the user equipment to a transmission resource and a radio communication module configured to transmit the downlink control information to the user equipment using the transmission resource, wherein the downlink control information for the user equipment includes a downlink grant and an uplink grant, wherein the processor is configured to allocate the downlink grant to either a first slot or a second slot of a subframe among the transmission resource, wherein the processor is configured to allocate the uplink grant to at least one of a first slot and a second slot of a subframe among the transmission resource.

It is to be understood that both the foregoing general description and the following detailed description are exemplary and explanatory and are intended to provide further explanation of the invention as claimed.

Advantageous Effects

According to embodiment of the present invention, an eNode B can efficiently transmit control information in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 6 is a diagram for a resource unit used for configuring a downlink control channel in LTE system;

BEST MODE

Mode for Invention

Figure 1:
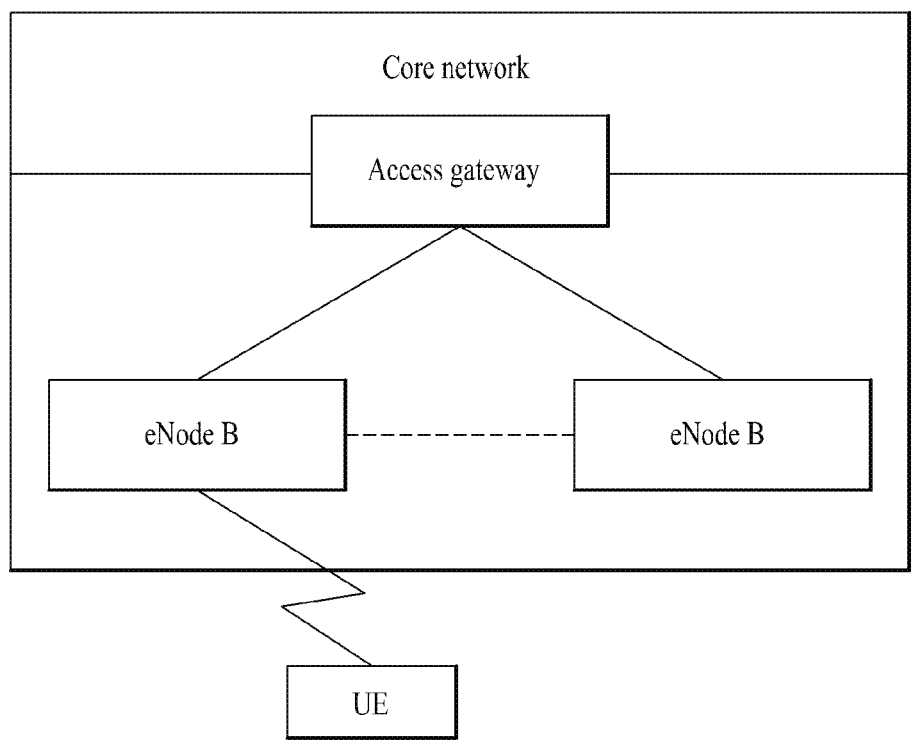
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
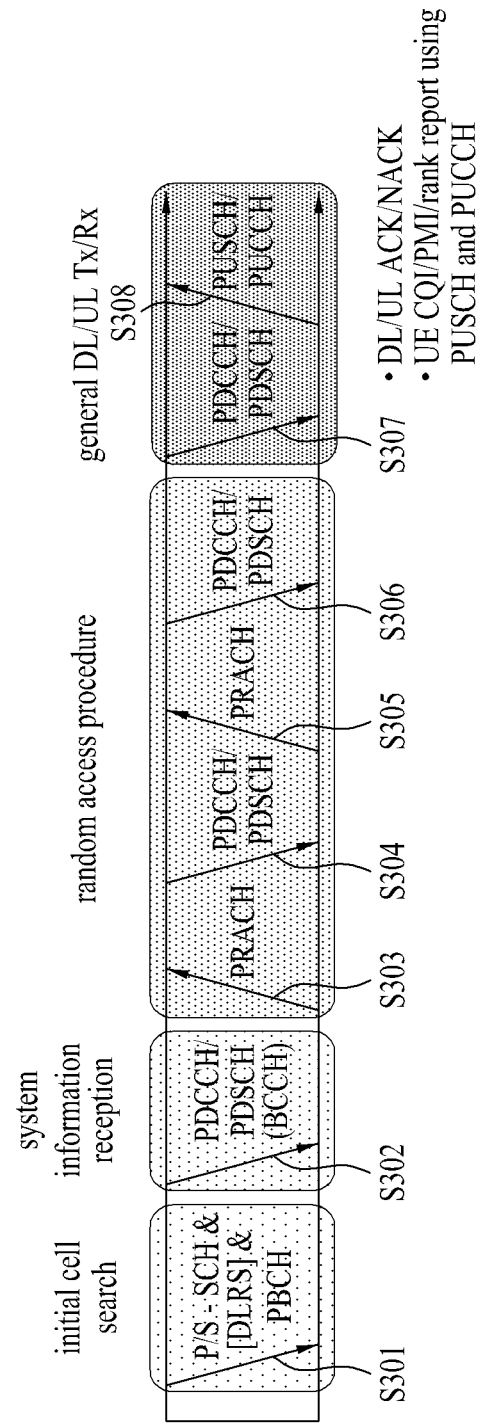
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 4:
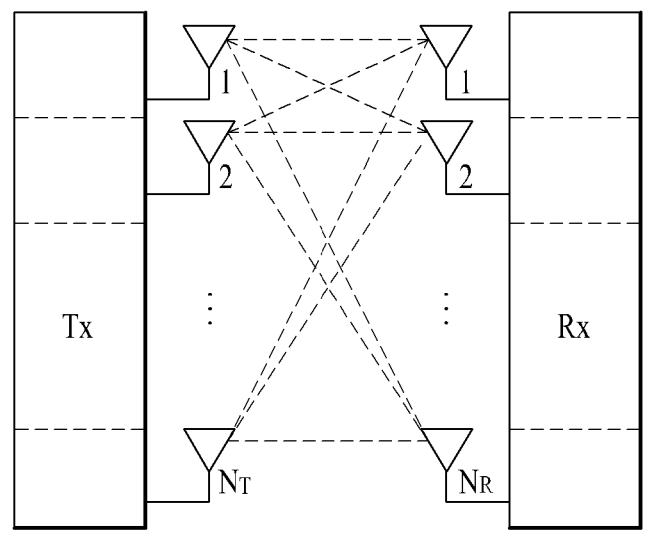
FIG. 4 is a diagram for a configuration of a multiple antenna communication system.

A block diagram of a general multi-antenna communication system is depicted in FIG. 4. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, T_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90 s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

Figure 7:
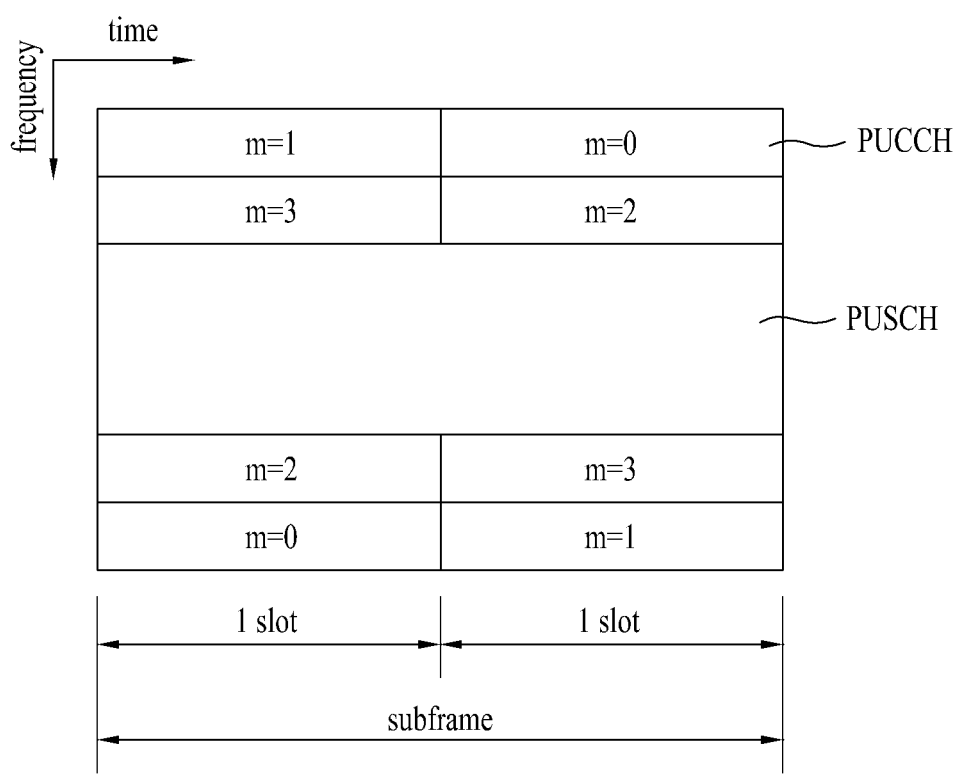
FIG. 7 is a diagram for a structure of an uplink radio frame in LTE system.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Formula 5]}$$

$$= W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Figure 5:
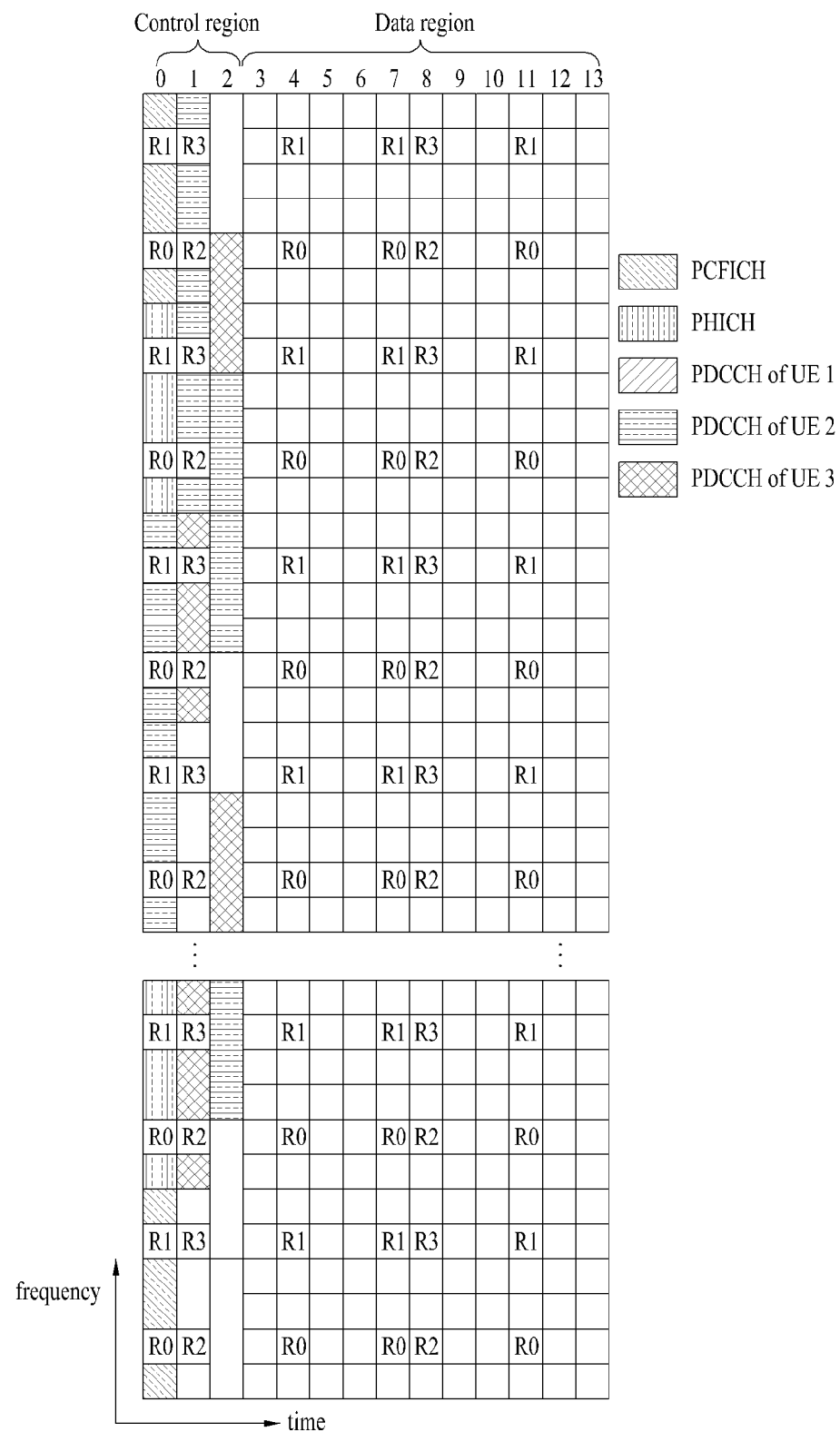
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

FIG. 6 is a diagram of a resource unit used for constructing a downlink control channel in LTE system. In particular, FIG. 6 (a) indicates a case that the number of transmitting antennas of an eNode B corresponds to 1 or 2 and FIG. 6 (b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 6, a base resource unit of a downlink control channel is a REG. The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the $M^{(L)}$ ($\geq L$) number of contiguous CCEs or the CCEs arranged by a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 1.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L indicates the number of CCEs configuring the PDCCH, $S_k^{(L)}$ indicates a search space of the CCE aggregation level L, and $M^{(L)}$ indicates the number of candidate PDCCH, which should be monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

FIG. 7 is a diagram for a structure of an uplink subframe used in LTE system.

Referring to FIG. 7, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 7 shows an example that the PUCCHs satisfying conditions (e.g., m=0, 1, 2, 3) are assigned to a subframe.

Meanwhile, In case that a channel status between an eNode B and a user equipment is poor, a relay node (RN) is installed between the eNode B and the user equipment, thereby providing the user equipment with a radio channel having a better channel status. Moreover, by introducing a relay node into a cell edge area having a poor channel status from an eNode B, if the relay node is used, it may provide a faster data channel and extend a cell service area. Thus, the relay node is a technology introduced to solve a propagation shadow zone problem of a wireless communication system and is widely used.

Compared to a conventional relay node having a function limited to a function of a repeater configured to simply amplify and transmit a signal, a recent relay node is evolved into a further-intelligent form. Moreover, the relay node technology corresponds to the technology essential to service coverage extension and data throughput improvement as well as cost reductions for base station expansion and backhaul network maintenance in a next generation mobile communication system. To keep up with the ongoing development of the relay node technology, it is necessary for a new wireless communication system to support a relay node used by the related art wireless communication system.

In 3GPP LTE-A ($3^{rd}$ Generation Partnership Project Long Term Evolution-Advanced) system, as a relay node is introduced to play a role of forwarding a linkage between an eNode B and a user equipment, links of two types differing from each other in attribute are applied to a UL carrier frequency band and a DL carrier frequency band, respectively. A connecting link part established between an eNode B and a relay node is represented in a manner of being defined as a backhaul link. If transmission is performed by FDD (frequency division duplex)) or TDD (time division duplex) using a DL resource, it may be represented as a backhaul downlink. If transmission is performed by FDD or TDD using a UL resource, it may be represented as a backhaul uplink.

Figure 8:
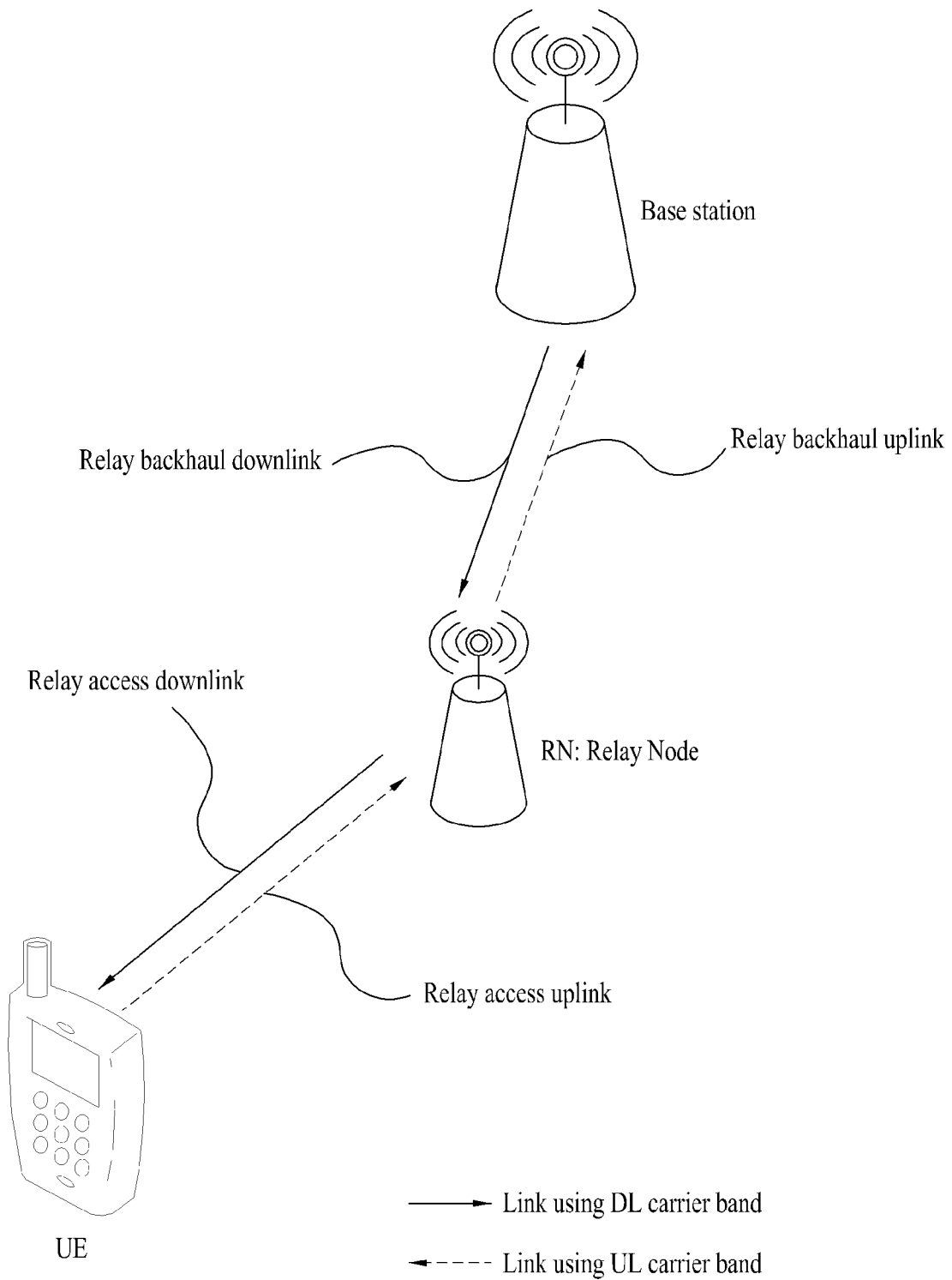
FIG. 8 is a diagram for a configuration of a relay backhaul link and a relay access link in a wireless communication system.

FIG. 8 is a diagram for a configuration of a relay backhaul link and a relay access link in a wireless communication system.

Referring to FIG. 8, as a relay node is introduced to play a role of forwarding a linkage between an eNode B and a user equipment, links of two types differing from each other in attribute are applied to a UL carrier frequency band and a DL carrier frequency band, respectively. A connecting link part established between an eNode B and a relay node is represented in a manner of being defined as a relay backhaul link. If transmission is performed using a DL frequency band (frequency division duplex, in case of FDD) or DL subframe (time division duplex, in case of TDD) resource, it may be represented as a backhaul downlink. If transmission is performed using a UL frequency band (in case of FDD) or UL subframe (in case of TDD) resource, it may be represented as a backhaul uplink.

On the other hand, a connection link part established between relay node and user equipment is represented in a manner of being defined as a relay access link. If transmission is performed via a relay access link using a DL frequency band (in case of FDD) or a resource of a DL subframe (in case of TDD), it may be represented as an access downlink. If transmission is performed via a relay access link using a UL frequency band (in case of FDD) or a resource of a UL subframe (in case of TDD), it may be represented as an access uplink.

A relay node (RN) may receive information from an eNode B in relay backhaul downlink or transmit information to the eNode B in relay backhaul uplink. The relay node may transmit information to a user equipment in relay access downlink or receive information from the user equipment in relay access uplink.

Meanwhile, regarding a band (or spectrum) use of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter, a legacy user equipment) operating in a legacy LTE system (e.g., Release-8) to access a donor cell.

Relay nodes may be classified into a transparent relay node and a non-transparent relay node depending on whether a user equipment recognizes the relay node. In particular, the 'transparent' means a case that a user equipment is unable to recognize whether the user equipment is communicating with a network through a relay node. And, the 'non-transparent' means a case that a user equipment is able to recognize whether the user equipment is communicating with a network through a relay node.

In relation to controls of a relay node, the relay node may be classified into a relay node configured as a part of a donor cell and a relay node capable of controlling a cell by itself.

Although the relay node configured as a part of the donor cell may have a relay node identity (ID), the relay node does not have a cell identity of its own. If at least one portion of RRM (Radio Resource Management) is controlled by an eNode B having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 ($2^{nd}$ layer) relay nodes, and type-2 relay nodes may belong to the category of the above-mentioned relay node.

In case of the relay node configured to control a cell by itself, this relay node controls one or more cells, a unique physical layer cell identity is provided to each cell controlled by the relay node, and the same RRM mechanism may be usable for the relay node. In aspect of a user equipment, there is no difference between accessing a cell controlled by a relay node and accessing a cell controlled by a general eNode B. Preferably, a cell controlled by the above-mentioned relay node may be able to support a legacy user equipment. For example, a self-backhauling relay node, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy eNode B (e.g., an eNode B operating in the LTE Release-8 system). In particular, the type-1 relay node has backward compatibility. Meanwhile, in aspect of user equipments operating in LTE-A system, the type-1 relay node is considered as an eNode B different from a legacy eNode B, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, In order for a relay node to operate in in-band, prescribed resources in time-frequency space must be reserved for a backhaul link and these resources may be configured not to be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) (i.e., either the backhaul downlink or the access downlink is activated in specific time). Similarly, a backhaul uplink and an access uplink may be multiplexed together on a single carrier frequency by TDM (i.e., either the backhaul uplink or the access uplink can be activated on a specific time).

Regarding the backhaul link multiplexed by FDD, a backhaul downlink transmission is performed on a downlink frequency band, and a backhaul uplink transmission is performed on an uplink frequency band. Regarding the backhaul link multiplexed by TDD, a backhaul downlink transmission is performed in a downlink subframe of an eNode B and a relay node, and a backhaul uplink transmission is performed in an uplink subframe of the eNode B and the relay node.

In case of an in-band relay node, for example, provided that both a backhaul downlink reception from an eNode B and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to an eNode B are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on/under the ground).

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 9:
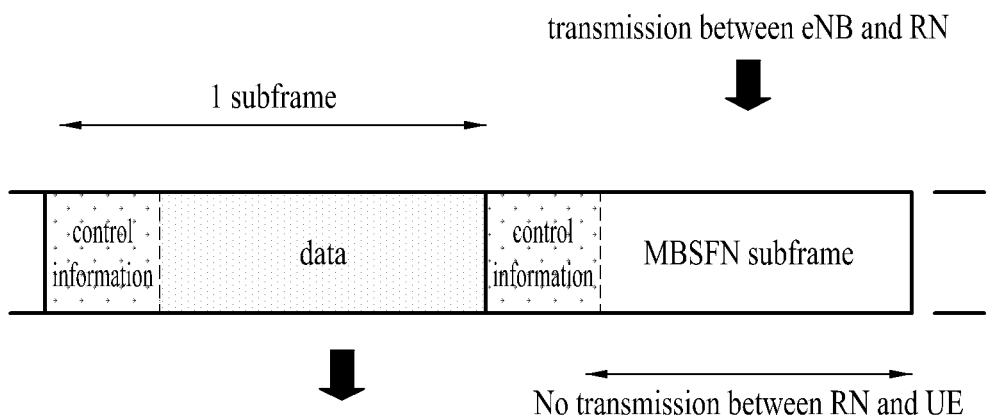
FIG. 9 is a diagram for an example of a relay node resource partition.

FIG. 9 is a diagram for an example of a relay node resource partition.

Referring to FIG. 9, a first subframe is a normal subframe and a downlink (i.e., an access down link) control signal and data are transmitted from a relay node to a user equipment. A $2^{nd}$ subframe is an MBSFN subframe. The control signal is transmitted from the relay node to the user equipment in a control region of the DL subframe. Yet, no transmission is performed from the relay node to the user equipment in the rest of the region of the DL subframe. In this case, since a legacy user equipment is configured to expect a transmission of a physical downlink control channel (PDCCH) in all DL subframes (i.e., since it is necessary for the relay node to support the legacy user equipments within the region of the relay node to perform a measuring function in a manner of receiving the PDCCH on every subframe), it is necessary to transmit the PDCCH in all DL subframes for a correct operation of the legacy user equipment. Hence, even in the subframe configured for the downlink (i.e., backhaul downlink) transmission from the eNode B to the relay node, it is necessary for the relay node not to receive a backhaul downlink but to perform an access downlink transmission in the first N (N is 1, 2, or 3) number of OFDM symbol interval of the subframe. Regarding this, since the PDCCH is transmitted from the relay node to the user equipment in the control region of the 2nd subframe, backward compatibility for the legacy user equipment serving in the relay node may be provided. In the rest of the region of the $2^{nd}$ subframe, the relay node may be able to receive a transmission from the eNode B while no transmission is performed from the relay node to the user equipment. Therefore, by using the resource partitioning, it may enable not to perform the access downlink transmission and the backhaul downlink reception at the same time in an in-band relay node.

The $2^{nd}$ subframe using an MBSFN subframe is explained in detail. A control region of the $2^{nd}$ subframe may be called a relay node non-hearing interval. The relay node non-hearing interval means an interval for the relay node to transmit an access downlink signal without receiving a backhaul downlink signal. This interval can be configured by the length of 1, 2, or 3 OFDMs. The relay node performs an access downlink transmission to a user equipment in the relay node non-hearing interval and may be able to receive a backhaul downlink from an eNode B in the rest of the region. At this time, since the relay node is unable to perform a transmission and reception at the same time on an identical frequency band, it takes time for the relay node to change from a transmitting mode to a receiving mode. Thus, it is necessary to configure a guard time (GT) in order for the relay node to switch from the receiving mode to the transmitting mode in a first prescribed part of the interval of the backhaul downlink receiving region. Similarly, in case that the relay node operates to receive the backhaul link from the eNode B and to transmit the access downlink to the user equipment, it may be able to configure the guard time (GT) in order for the relay node to switch from the receiving mode to the transmitting mode. The length of the guard time may be given by the value of the time domain. For instance, it may be given by the value of k ($k \geq 1$) number of time sample (Ts) or may be configured by the length of one or more OFDM symbols. Or, the guard time of the last part of the subframe may not be defined or configured in case that the relay node backhaul downlink subframe is configured consecutively or according to a prescribed subframe timing alignment relationship. In order to maintain a backward compatibility, the guard time can be defined on the frequency domain configured for the backhaul downlink subframe transmission only (if the guard time is configured in the access downlink interval, a legacy user equipment may not be supported). The relay node may be able to receive PDCCH and PDSCH in the backhaul downlink receiving interval except the guard time. This may be represented as an R-PDCCH (relay-PDCCH) and an R-PDSCH (relay-PDSCH) in a meaning of a relay node dedicated physical channel.

As various devices requiring M2M (machine-to-machine) communication and high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user. A system equipped with the node of high density may have higher system performance by means of cooperation between nodes. Compared to a node operating as an independent base station (a base station (BS), an advanced BS (ABS), a Node-B (NB), an eNode-B (eNB), an access point (AP), and the like) without cooperation, the aforementioned scheme may have superior performance.

Figure 10:
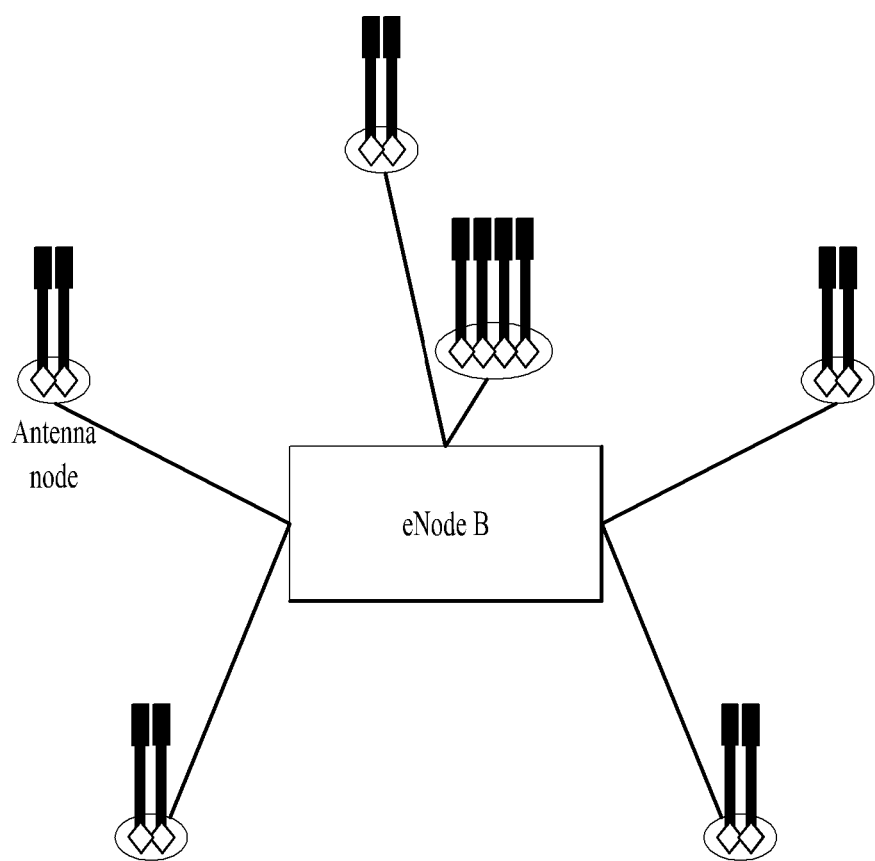
FIG. 10 is a diagram for an example of a multi node system in a next generation communication system.

FIG. 10 is a diagram for an example of a multi node system in a next generation communication system.

Referring to FIG. 10, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system and a relay node, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only.

Figure 11:
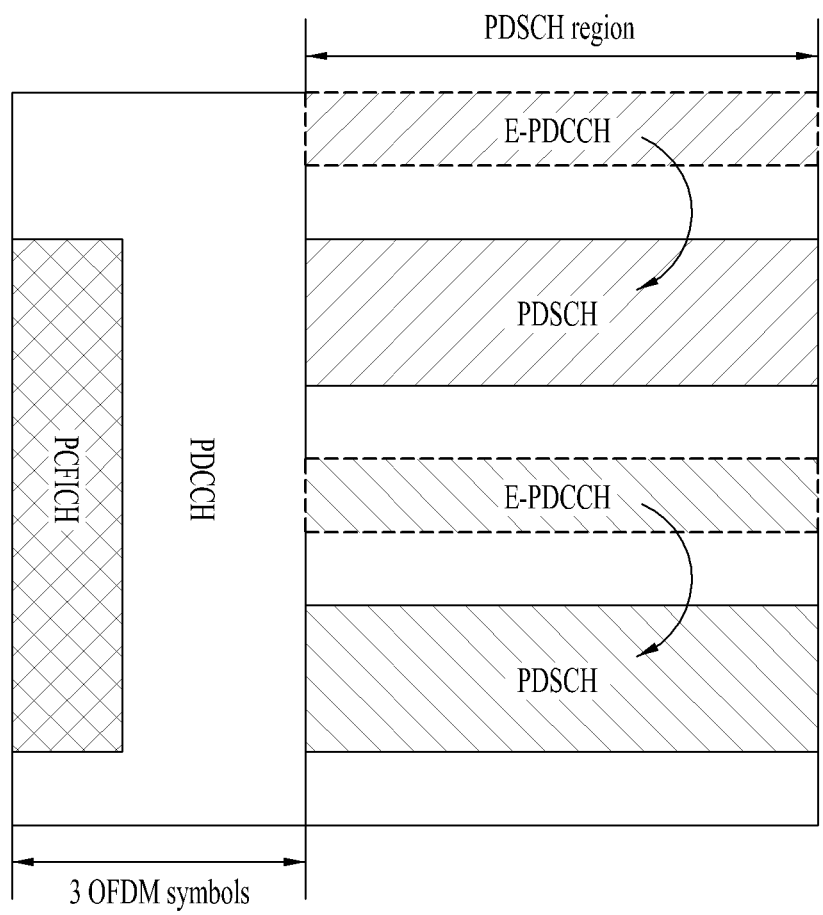
FIG. 11 is a diagram for an example of E-PDCCH and PDSCH scheduled by E-PDCCH.

FIG. 11 is a diagram for an example of E-PDCCH and PDSCH scheduled by E-PDCCH.

Referring to FIG. 11, E-PDCCH can be used in a manner of defining a part of PDSCH region, which is generally transmitting data. A UE should perform a blind decoding process to detect presence or non-presence of the E-PDCCH in the UE. The E-PDCCH performs a scheduling operation (i.e., PDSCH, PUSCH control) identical to that of a legacy PDCCH. Yet, if the number of such a UE accessed a node as an RRH increases, more E-PDCCHs are assigned to the PDSCH region. Hence, the number of blind decoding, which should be performed by the UE, increases and complexity may increase as well.

Meanwhile, in case of specifically assigning an E-PDCCH, there exists an approaching scheme of reusing a legacy R-PDCCH structure.

Figure 12:
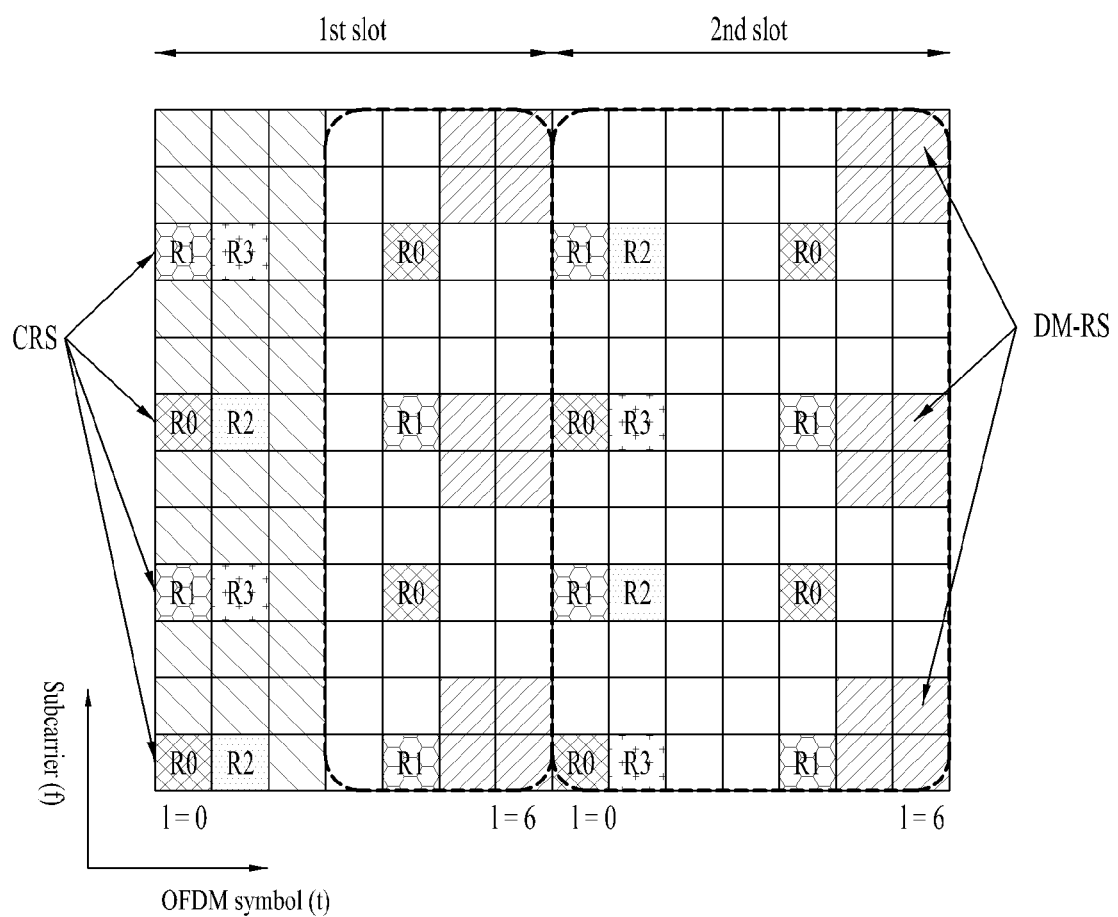
FIG. 12 is a diagram for an example of a structure of R-PDCCH transmitted to a relay node.

FIG. 12 is a diagram for an example of a structure of R-PDCCH transmitted to a relay node.

Referring to FIG. 12, a DL grant should be allocated to a first slot only and a UL grant or a data PDSCH can be allocated to a second slot. In this case, an R-PDCCH is assigned to a data RE except all of a PDCCH region, a CRS, and a DM-RS. Both the DM-RS and the CRS can be used to decode the R-PDCCH. In case of using the DM-RS, a port 7 and a scrambling ID (SCID)=0 are used.

On the contrary, in case of using the CRS, a port 0 is used when the number of PBCH transmission antenna corresponds to 1 only. When the number of PBCH transmission antenna corresponds to 2 or 4, both port 0-1 and port 0-3 are used by converting to a transmit diversity mode.

In case of specifically assigning an E-PDCCH, reusing a legacy R-PDCCH structure means to allocate a DL grant and a UL grant in a manner of dividing them according to a slot. In the present invention, the aforementioned assigning scheme is called a related art 1).

Figure 13:
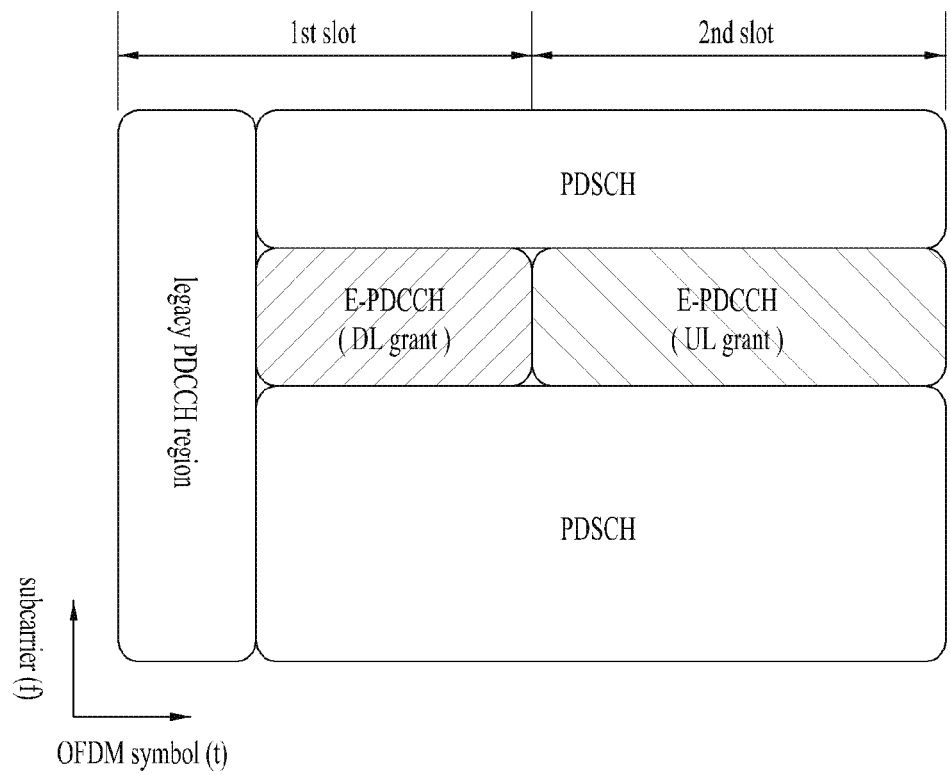
FIG. 13 is a diagram for an example of E-PDCCH assigned according to a related art 1)

FIG. 13 is a diagram for an example of E-PDCCH assigned according to a related art 1).

According to the related art 1), in assigning E-PDCCH, a DL grant is allocated to a first slot and a UL grant is allocated to a second slot of a subframe. In the present specification, assume that the E-PDCH is configured in both the first slot and the second slot. In this case, the DL grant and the UL grant are allocated to the E-PDCCH of the first slot and the E-PDCCH of the second slot, respectively.

Since the DL grant and the UL grant are divided according to a slot in a subframe, a UE performs a blind decoding configured to search for the DL grant in a manner of configuring a searching region in the first slot and performs a blind decoding configured to search for the UL grant in a manner of configuring a searching region in the second slot.

Meanwhile, there exist a downlink transmission mode (DL TM) and an uplink transmission mode (UL TM) in a current 3GPP LTE system and one TM is set to each UE via an upper layer signaling. There exist 2 formats of downlink control information, i.e., a DCI format, which should be found out by each UE, depending on a configured mode in the DL TM. On the contrary, there exist one or two DCI formats, which should be found out by each UE, depending on a configured mode in the UL TM. For instance, DL control information corresponding to the UL grant is a DCI format 0 in a UL TM 1 and DL control information corresponding to the UL grant is a DCI format 0 and DCI format 4 in a UL TM 2. For reference, the DL TM is defined by a mode 1 to mode 9 and the UL TM is defined by one of a mode 1 and a mode 2.

Hence, as depicted in FIG. 13, the number of blind decoding, which should be performed for each of a DL grant allocation region and a UL grant allocation region in order for a UE to search for E-PDCCH of the UE in a UE-specific searching region according to a slot, is as follows.

(1) DL grant=(the number of candidate PDCCHs)×(the number of DCI formats in a configured DL TM)=16×2=32

(2) UL grant in UL TM 1=(the number of candidate PDCCHs)×(the number of DCI formats in UL TM 1)=16×1=16

(3) UL grant in UL TM 2=(the number of candidate PDCCHs)×(the number of DCI formats in UL TM 2)=16×2=32

(4) The total number of blind decoding=the number of blind decoding in a first slot+the number of blind decoding in a second slot
UL TM 1: 32+16=48
UL TM 2: 32+32=64

Meanwhile, a method of simultaneously allocating both a DL grant and a UL grant to a first slot is proposed as well. For clarity, this is called a related art 2).

Figure 14:
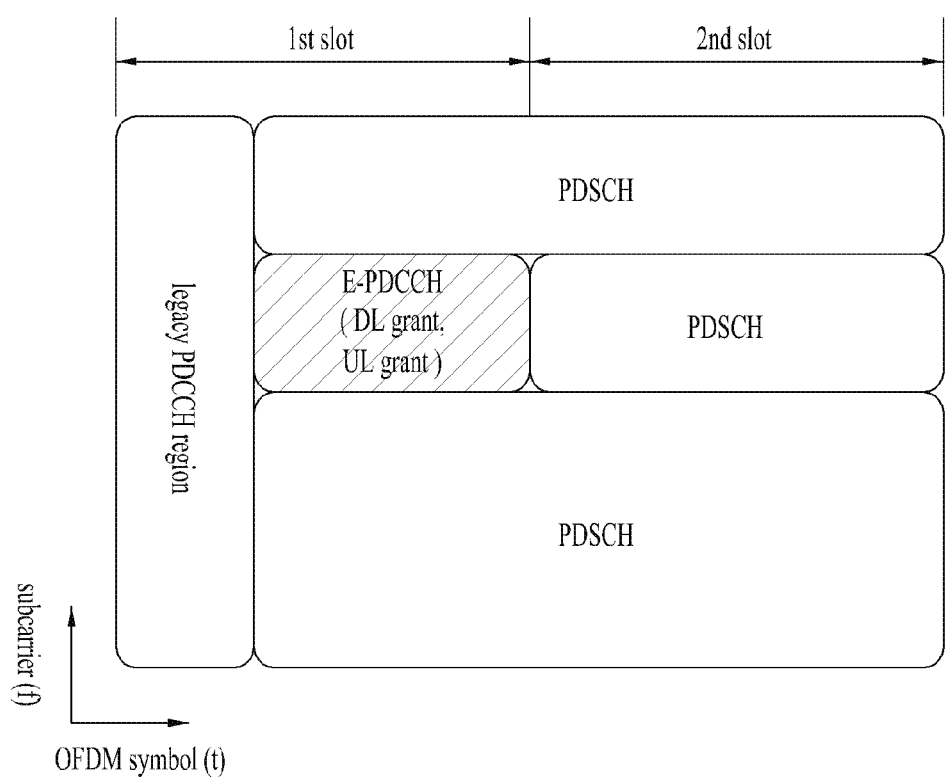
FIG. 14 is a diagram for an example of E-PDCCH assigned according to a related art 2)

FIG. 14 is a diagram for an example of E-PDCCH assigned according to a related art 2).

Referring to FIG. 14, in assigning E-PDCCH, both a DL grant and a UL grant are allocated to a first slot of a subframe at the same time. In particular, FIG. 14 assumes a case that E-PDCCH is configured in a first slot of a subframe only. Hence, both the DL grant and the UL grant simultaneously exist in the E-PDCCH of the first slot and a UE performs a blind decoding, which is performed by the UE to find out the DL grant and the UL grant, in the first slot of the subframe only.

As mentioned in the foregoing description, a DCI format to be found out is determined by a TM configured according to a UE in 3GPP LTE system. In particular, two DCI formats, i.e., DL grants are determined in accordance with each DL TM and a DCI format 1A is basically included in all DL TMs to support a fall-back mode. Among the UL grant, since a DCI format 0 has a length identical to that of a DCI format 1A and can be identified by a 1-bit flag, the DCI format 0 does not perform an additional blind decoding. Yet, a DCI format 4, which corresponds to the rest of the UL grants, should perform an additional blind decoding.

Hence, in order to perform a blind decoding identical to a legacy PDCCH region and search for E-PDCCH in a UE-specific search region, in particular, in order to find out a DL grant and a UL grant, the blind decoding should be performed as many as follows.
- (1) DL grant=(the number of candidate PDCCHs)×(the number of DCI formats in a configured DL TM)=16×2=32
- (2) UL grant in UL TM 1=(the number of candidate PDCCHs)×(the number of DCI formats in UL TM 1)=0
- (3) UL grant in UL TM 2=(the number of candidate PDCCHs)×(the number of DCI formats in UL TM 2)=16×1=16
- (4) The total number of blind decoding
  UL TM 1: 32+0=32
  UL TM 2: 32+16=48

In the following description, the present invention proposes a method of managing a DL grant and a UL grant of E-PDCCH. As mentioned in the foregoing description, although a main design method of E-PDCCH can be mostly inherited by a structure of a legacy R-PDCCH, unlike the R-PDCCH, in managing E-PDCCH, a method of allocating a DL grant and a method of allocating a UL grant may be different from each other according to a slot.

Hence, the present invention proposes a method of transmitting a DL grant of E-PDCCH in one slot among two slots in a subframe and a method of transmitting a UL grant in both slots in the following description.

Figure 15:
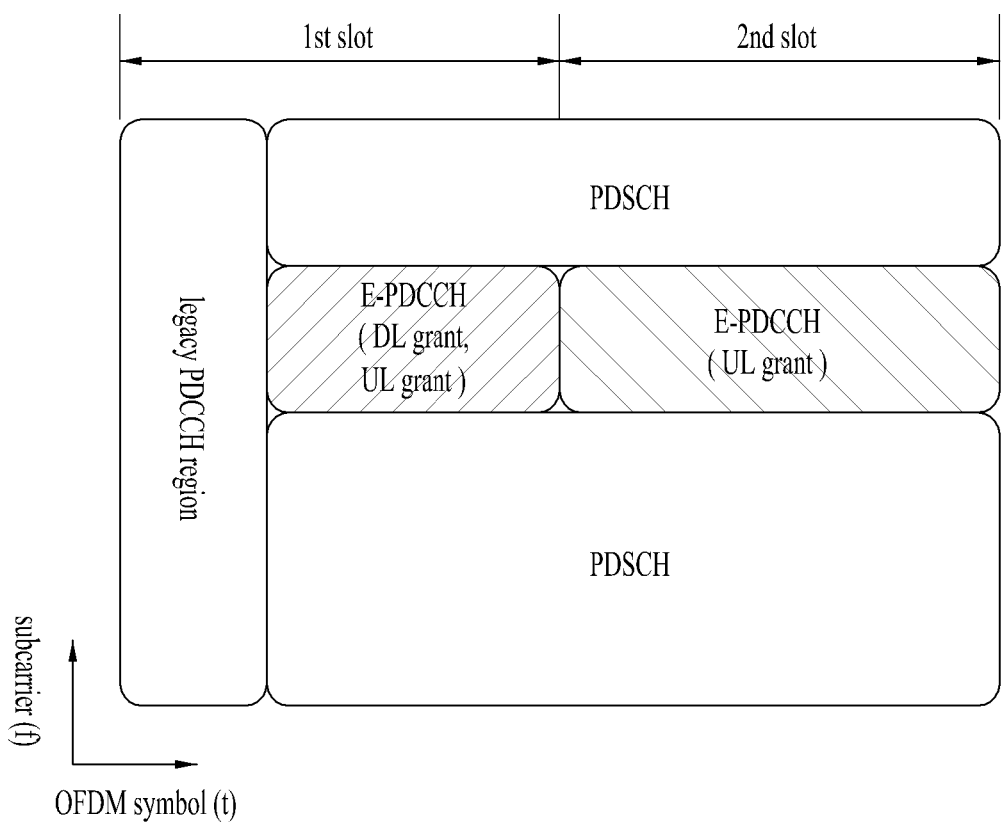
FIG. 15 is a diagram for an example of E-PDCCH assigned according to embodiment of the present invention.

FIG. 15 is a diagram for an example of E-PDCCH assigned according to embodiment of the present invention.

Referring to FIG. 15, assume that E-PDCCH is configured in both a first slot and a second slot in a subframe. For instance, both a DL grant and a UL grant are transmitted to the E-PDCCH of the first slot and the UL grant can be transmitted to the E-PDCCH of the second slot only. Hence, a UE performs a blind decoding in the first slot within the subframe to simultaneously find out both the DL grant and the UL grant and performs a blind decoding in the second slot to find out the UL grant only.

As mentioned in the foregoing description, a DCI format to be found out is determined by a TM configured according to a UE in 3GPP LTE system. In particular, two DCI formats, i.e., DL grants are determined in accordance with each DL TM and a DCI format 1A is basically included in all DL TMs to support a fall-back mode. Among the UL grant, since a DCI format 0 has a length identical to that of a DCI format 1A and can be identified by a 1-bit flag, the DCI format 0 does not perform an additional blind decoding. Yet, performance of an additional blind decoding is requested for the UL grant existing in a second slot only. The number of additional blind decoding varies according to a UL TM.

As described in the present invention, in case of performing a blind decoding identical to a legacy PDCCH region in a first slot and performing an additional blind decoding in a second slot according to a UL TM, the number of blind decoding is as follows.
  (A) First slot
  DL grant=(the number of candidate PDCCHs)×(the number of DCI formats in a configured DL TM)=16×2=32
  UL grant in UL TM 1=(the number of candidate PDCCHs)×(the number of DCI formats in UL TM 1)=0
  UL grant in UL TM 2=(the number of candidate PDCCHs)×(the number of DCI formats in UL TM 2)=16×1=16
  (B) Second slot
  DL grant: 0 (none)
  UL grant in UL TM 1=(the number of candidate PDCCHs)×(the number of DCI formats in UL TM 1)=16×1=16
  UL grant in UL TM 2=(the number of candidate PDCCHs)×(the number of DCI formats in UL TM 2)=16×2=32
  (3) The total number of blind decoding=the number of blind decoding in a first slot+the number of blind decoding in a second slot
  UL TM 1: 32+16=48
  UL TM 2: 32+16+32=80

As described in the present specification, in managing E-PDCCH, since UL grants for a UE, which receives a UL grant only without PDSCH, can be collected in a part of RBs, slots usable for PDSCH transmission for a different UE may increase.

Figure 16:
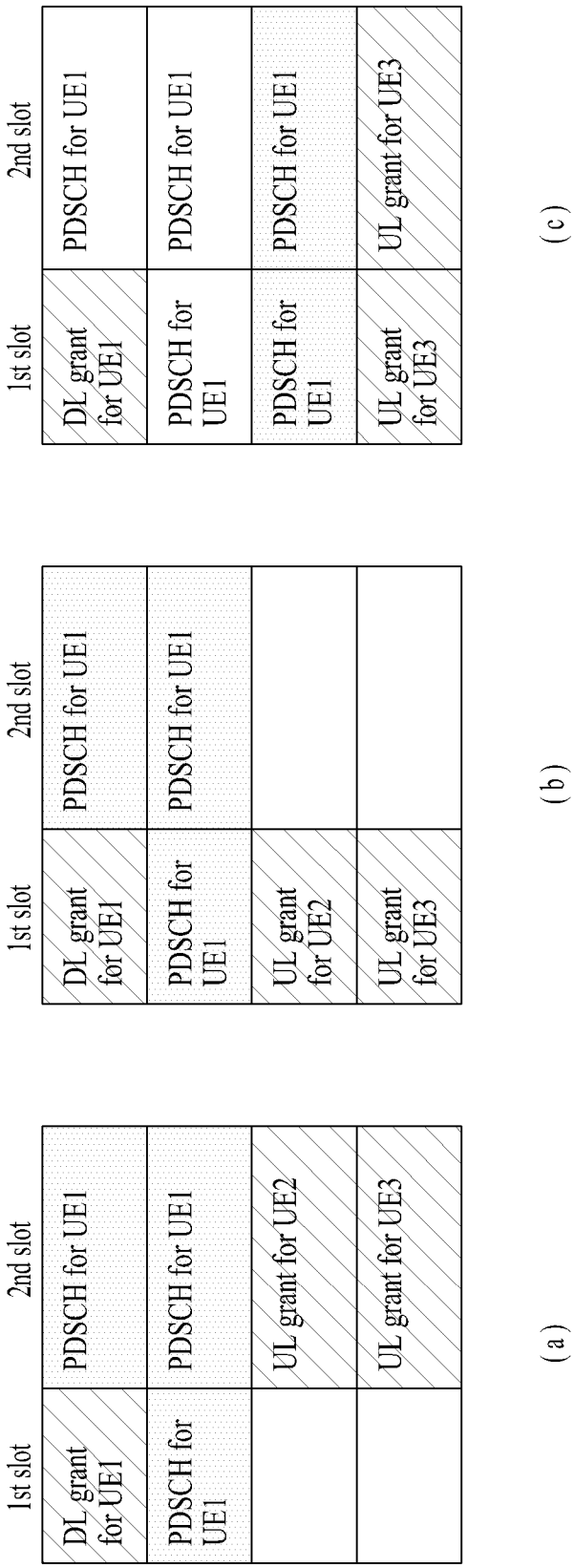
FIG. 16 is a diagram for an example of enhancing resource utilization in case that E-PDCCH is assigned according to embodiment of the present invention.

FIG. 16 is a diagram for an example of enhancing resource utilization in case that E-PDCCH is assigned according to embodiment of the present invention. In particular, FIG. 16 (*a*) is a case that E-PDCCH is assigned according to the related art 1), FIG. 16 (*b*) is a case that E-PDCCH is assigned according to the related art 2), and FIG. 16 (*c*) is a case that E-PDCCH is assigned according to the present invention.

Referring to FIG. 16, in case of transmitting a UL grant to one slot only, as depicted in FIG. 16 (*a*) and FIG. 16 (*b*), it is difficult to utilize the rest slot of an RB. Yet, according to the present invention, it is able to know that all slots of all RBs can be utilized.

Figure 17:
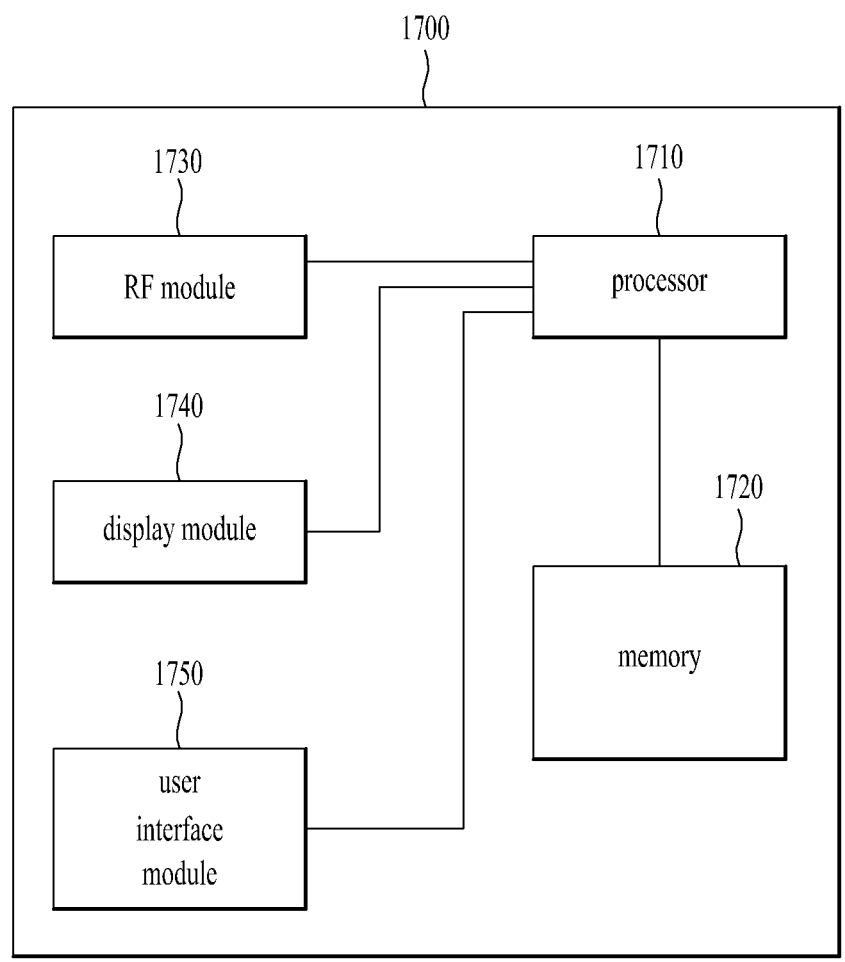
FIG. 17 is a block diagram for an example of a communication device according to one embodiment of the present invention.

FIG. 17 is a block diagram for an example of a communication device according to one embodiment of the present invention.

Referring to FIG. 17, a communication device 1700 may include a processor 1710, a memory 1720, an RF module 1730, a display module 1740, and a user interface module 1750.

Since the communication device 1700 is depicted for clarity of description, prescribed module(s) may be omitted in part. The communication device 1700 may further include necessary module(s). And, a prescribed module of the communication device 1700 may be divided into subdivided modules. A processor 1710 is configured to perform an operation according to the embodiments of the present invention illustrated with reference to drawings. In particular, the detailed operation of the processor 1710 may refer to the former contents described with reference to FIG. 1 to FIG. 16.

The memory 1720 is connected with the processor 1710 and stores an operating system, applications, program codes, data, and the like. The RF module 1730 is connected with the processor 1710 and then performs a function of converting a baseband signal to a radio signal or a function of converting a radio signal to a baseband signal. To this end, the RF module 1730 performs an analog conversion, amplification, a filtering, and a frequency up conversion, or performs processes inverse to the former processes. The display module 1740 is connected with the processor 1710 and displays various kinds of information. And, the display module 1740 can be implemented using such a well-known component as an LCD (liquid crystal display), an LED (light emitting diode), an OLED (organic light emitting diode) display and the like, by which the present invention may be non-limited. The user interface module 1750 is connected with the processor 1710 and can be configured in a manner of being combined with such a well-known user interface as a keypad, a touch screen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting control information, which is transmitted by an eNode B in a wireless communication system and an apparatus therefore are described with reference to examples applied to a 3GPP LTE system, it may be applicable to various kinds of wireless communication systems as well as the 3GPP LTE system.

What is claimed is:

1. A method of transmitting downlink control information to a user equipment at an eNode B in a wireless communication system, the method comprising:
    allocating the downlink control information for the user equipment to a transmission resource for an enhanced physical downlink control channel (ePDCCH) other than a relay physical downlink control channel (R-PDCCH); and
    transmitting the downlink control information to the user equipment using the transmission resource via the ePDCCH,
    wherein the downlink control information for the user equipment comprises a downlink grant and one or more uplink grants,
    wherein the downlink grant is allocated to either a first slot or a second slot of a subframe among the transmission resource,
    wherein the uplink grants are allocated to both of the first slot and the second slot of a subframe among the transmission resource, respectively, and
    wherein a number of first blind decoding to be performed for a first uplink grant in the first slot is different from a number of second blind decoding to be performed for a second uplink grant in the second slot.

2. The method according to claim 1, wherein the downlink grant is allocated to the first slot of the subframe only among the transmission resource.

3. The method according to claim 1, wherein the transmission resource corresponds to a data region of the subframe.

4. The method according to claim 1, wherein data information for the user equipment is allocated to at least one of the first slot and the second slot of the subframe among the transmission resource.

5. The method of claim 1, wherein the number of the first blind decoding is less than the number of the second blind decoding.

6. The method of claim 1, wherein the difference between the number of the first blind decoding and the number of the second blind decoding corresponds to '16'.

7. The method of claim 1, wherein the number of first blind decoding and the number of the second blind decoding depend on an uplink transmission mode configured in the user equipment.

8. An eNode B device in a wireless communication system, the eNode B device comprising:
    a processor configured to allocate downlink control information for the user equipment to a transmission resource for an enhanced physical downlink control channel (ePDCCH) other than a relay physical downlink control channel (R-PDCCH); and
    a radio communication module configured to transmit the downlink control information to the user equipment using the transmission resource via the ePDCCH,
    wherein the downlink control information for the user equipment comprises a downlink grant and one or more uplink grants,
    wherein the processor is configured to allocate the downlink grant to either a first slot or a second slot of a subframe among the transmission resource,
    wherein the processor is configured to allocate the uplink grants to both of the first slot and the second slot of the subframe among the transmission resource, respectively, and
    wherein a number of first blind decoding to be performed for a first uplink grant in the first slot is different than a number of second blind decoding to be performed for a second uplink grant in the second slot.

9. The eNode B device according to claim 8, wherein the processor is configured to allocate the downlink grant to the first slot of the subframe only among the transmission resource.

10. The eNode B device according to claim 8, wherein the transmission resource corresponds to a data region of the subframe.

11. The eNode B device according to claim 8, wherein the processor is configured to allocate data information for the user equipment to at least one of the first slot and the second slot of the subframe among the transmission resource.

12. A method of receiving downlink control information by a user equipment in a wireless communication system, the method comprising:

performing blind decoding the transmission resource to which downlink control information is allocated for an enhanced physical downlink control channel (ePDCCH) other than a relay-PDCCH (R-PDCCH); and obtaining the downlink control information allocated to the transmission resource, wherein the downlink control information comprises a downlink grant and one or more uplink grants, wherein the downlink grant is allocated to either a first slot or a second slot of a subframe among the transmission resource, wherein the uplink grants are allocated to both of the first slot and the second slot of the subframe among the transmission resource, and wherein a number of first blind decoding to be performed for a first uplink grant in the first slot is different than a number of second blind decoding to be performed for a second uplink grant in the second slot.

13. The method of claim 12, wherein the number of the first blind decoding is greater than the number of the second blind decoding.

14. The method of claim 12, wherein the difference between the number of the first blind decoding and the number of the second blind decoding corresponds to '16'.

15. The method of claim 12, wherein the number of the first blind decoding and the number of the second blind decoding depend on an uplink transmission mode configured in the user equipment.

\* \* \* \* \*